「12」 United States Patent
Achkir

(10) Patent No.: US 10,739,530 B2
(45) Date of Patent: Aug. 11, 2020

(54) UBIQUITOUS OPTICAL CLEANING APPARATUS

(71) Applicant: Cisco Technology, Inc., San Jose, CA (US)

(72) Inventor: Brice Achkir, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 548 days.

(21) Appl. No.: 15/370,480

(22) Filed: Dec. 6, 2016

(65) Prior Publication Data

US 2018/0156984 A1 Jun. 7, 2018

(51) Int. Cl.
*G02B 6/38* (2006.01)
*B08B 9/04* (2006.01)
*B08B 1/00* (2006.01)
*B08B 11/00* (2006.01)

(52) U.S. Cl.
CPC ............ *G02B 6/3866* (2013.01); *B08B 1/001* (2013.01); *B08B 1/006* (2013.01); *B08B 1/008* (2013.01); *B08B 9/04* (2013.01); *B08B 11/00* (2013.01)

(58) Field of Classification Search
CPC ......... G02B 6/3866; B08B 1/006; B08B 9/04; B08B 1/008; B08B 11/00; B08B 1/001
See application file for complete search history.

(56) References Cited

U.S. PATENT DOCUMENTS

| 6,449,795 | B1* | 9/2002 | Sato | B08B 1/00 15/209.1 |
| 6,758,605 | B1* | 7/2004 | Villemaire | B08B 1/008 15/210.1 |
| 2002/0131748 | A1* | 9/2002 | Sato | G02B 6/25 385/134 |
| 2002/0195123 | A1 | 12/2002 | Strait et al. | |
| 2003/0203180 | A1* | 10/2003 | Tourigny | B08B 1/00 428/304.4 |
| 2006/0191091 | A1 | 8/2006 | Kida | |
| 2007/0023067 | A1* | 2/2007 | Kida | B08B 11/00 134/6 |

(Continued)

OTHER PUBLICATIONS

Extended European Search Report from the European Patent Office, dated Apr. 18, 2018, 5 pages, for the corresponding European Patent Application No. EP17204529.6.

*Primary Examiner* — Alexander Markoff
(74) *Attorney, Agent, or Firm* — Polsinelli PC

(57) ABSTRACT

A device for cleaning an optical communication device includes a hollow outer stem, an inner stem core, a locking handle, a flexible base, at least one ring seal, and a flexible cover. The inner stem core, fits within a length of the hollow outer stem and is slidable along the length of the hollow outer stem. The locking handle is coupled to a top end of the inner stem core, and is movable between a released position and a locked position, where moving the locking handle to the locked position from the released position slides the inner stem core within the hollow outer stem. The flexible base is coupled to a bottom end of the hollow outer stem, and is transformable between a contracted position when the locking handle is in the released position and an expanded position when the locking handle is in the locked position. The at least one ring seal is coupled to the flexible base. The flexible cover is wrapped around the flexible base and the at least one ring seal.

13 Claims, 3 Drawing Sheets

(56) References Cited

U.S. PATENT DOCUMENTS

| | | | |
|---|---|---|---|
| 2007/0039114 A1* | 2/2007 | Forrest, Jr. | A61F 13/38 15/209.1 |
| 2008/0034519 A1* | 2/2008 | Fujiwara | B08B 1/008 15/104.001 |
| 2011/0047731 A1* | 3/2011 | Sugita | G02B 6/3807 15/97.1 |
| 2011/0072600 A1* | 3/2011 | Nakane | B08B 1/04 15/97.1 |
| 2011/0154599 A1* | 6/2011 | Nakane | B08B 1/04 15/210.1 |
| 2012/0017384 A1* | 1/2012 | Fujiwara | G02B 6/3866 15/97.1 |
| 2012/0066849 A1* | 3/2012 | Fujiwara | B08B 1/00 15/97.1 |
| 2016/0011380 A1 | 1/2016 | Tourigny | |

* cited by examiner

UBIQUITOUS OPTICAL CLEANING APPARATUS

BACKGROUND

Field of the Invention

This application relates to a cleaning apparatus, and more particularly to a system and method for cleaning an optical communication device.

Description of the Related Art

Fiber optic cables have a number of advantages over electrical wires for data transmission. Fiber optic cables are low-loss, low-cost, and high-bandwidth. They provide transmission security and a larger number of data paths per circular area of the transmission medium. The low-loss characteristic allows data to be transmitted over greater distances before the signal must be amplified by "booster" equipment. Fiber optic cables are also immune from electromagnetic interference.

Standard connector (SC) and standard termination (ST) connectors are used in commercial wiring and are frequently used in multimode fiber applications in building and campus LAN cabling systems. ST connectors use a twist on-twist off type of housing. SC connectors use a push to snap on, and a push to snap off type of housing.

Most connector systems restrain the two fibers to be coupled within ferrules, which in turn are held in place by a housing. Within the housing, a precision alignment sleeve aligns the two ferrules and thus the two fibers. The fiber ends are flush with the ferrule ends and are polished to reduce loss of light. All modern connector designs involve physical contact between the two fiber ends. Loss of light at a connection is called insertion loss or attenuation and is measured in dB. Typically, attenuation for a mated pair of high quality connectors is 0.35 dB or less.

However, the interface between the ends of the two optical fiber strands is susceptible to fine dirt and dust particles and grease with the result that the exposed end of one or both optical fiber strands may become contaminated. This occurs when the interface is exposed to the atmosphere for any reason (e.g., when connecting or disconnecting the cables). This could lead to a possible severe degradation in the amount of light energy transferred between the fiber strands. Dust, dirt and other contaminants are a problem in such optical connections because they interfere with the passage of light from one fiber to another. Fiber optic connectors must be kept clean to ensure long life and to minimize transmission loss and optical return loss at the connection point. A single dust particle caught between two connectors will cause significant signal loss. Dust particles as small as 1 µm in diameter on the optical fiber end can significantly degrade performance. Particles 8 µm in diameter or larger on the end of the core can cause a complete failure of the optical system.

For this reason, technicians may periodically disassemble the fiber optic cable from the corresponding coupling of the mechanical connector and clean the end of the fiber cable with an appropriate cleaning device and associated solution. However, current cleaning devices mostly comprise of swabs that struggle to remove a sufficient percentage of contaminants from the fiber optic connectors to ensure the prevention of system failure.

BRIEF DESCRIPTION OF THE DRAWINGS

These and other sample aspects of the present technology will be described in the detailed description and the appended claims that follow, and in the accompanying drawings, wherein:

BRIEF INTRODUCTION

Figure 1A:
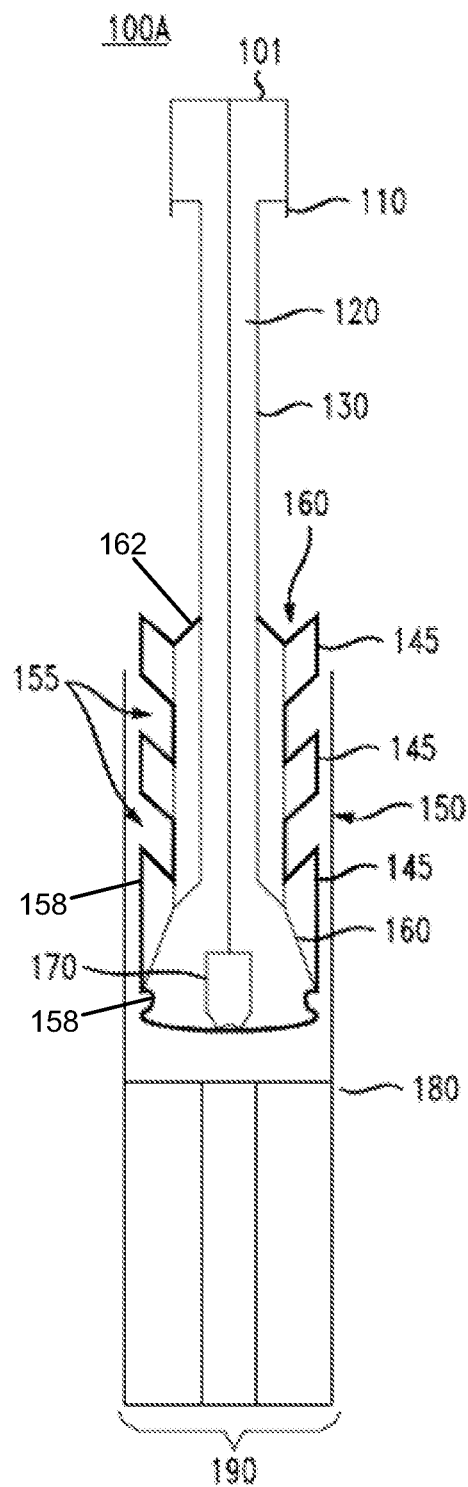
FIG. 1A illustrates a cross-sectional profile view of an example cleaning device in a contracted position.

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for cleaning an optical communication device. The cleaning apparatus disclosed provides an improved structure for cleaning contaminants in optical communication devices. In an aspect, a device for cleaning an optical communication device includes a hollow outer stem, an inner stem core, a locking handle, a flexible base, at least one ring seal, and a flexible cover. The inner stem core fits within a length of the hollow outer stem and is slidable along the length of the hollow outer stem. The locking handle is coupled to a top end of the inner stem core, and is movable between a released position and a locked position, where moving the locking handle to the locked position from the released position slides the inner stem core within the hollow outer stem. The flexible base is coupled to a bottom end of the hollow outer stem, and is transformable between a contracted position when the locking handle is in the released position and an expanded position when the locking handle is in the locked position. The at least one ring seal is coupled to the flexible base. The flexible cover is wrapped around the flexible base and the at least one ring seal.

The at least one ring seal in a contracted position has a smaller diameter such that the flexible base can be inserted into a housing without touching the inner wall surface. Transforming the flexible base between the contracted position and the expanded position causes the at least one ring seal to be expanded from a contracted configuration such that the at least one ring seal contacts an inner surface of a housing. In the expanded position, the at least one ring seal expands so as to be touching the inner wall of the housing. The flexible cover is also filled out by the expanded position of the at least one ring seal such that between the flexible cover and the ring seal, and spacing between ring seals when there is more than one ring seal provide the structure with which to capture contaminants within the housing and thus provide a cleaner fiber-optic connection.

In a second aspect, a method for cleaning an optical communication device, by a cleaning device, includes inserting a flexible base of the cleaning device into a barrel of the optical communication device. The locking handle of the cleaning device is moved from a released position to a locked position to transform the flexible base from a contracted position to an expanded position. At least one ring seal, coupled to the flexible base of the cleaning device, is pushed against an inner wall of the optical communication device when the locking handle of the cleaning device from the released position to the locked position. The cleaning device is rotated inside the barrel of the optical communication device and removed from the barrel of the optical communication device. A flexible cover can be wrapped around at least a portion of the flexible base and at least one of the ring seals. In the locked position, the at least one ring seal expands stretching the flexible cover into a tighter configuration. Between the tighter flexible cover and the at least one ring seal, the method includes removing contaminants by rotating the expanded cleaning device in the barrel of the optical communication device.

DETAILED DESCRIPTION

The subject disclosure provides techniques for remote controlled piloting aids for unmanned aerial vehicles, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Figure 1B:
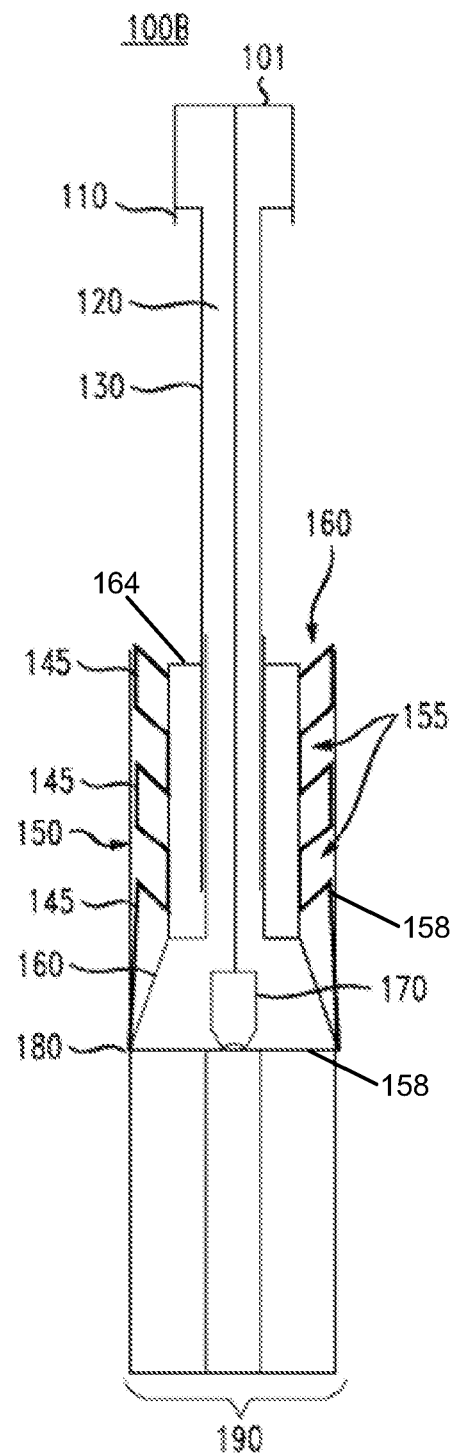
FIG. 1B illustrates a cross-sectional profile view of the example cleaning device of FIG. 1A in an expanded position.

FIG. 1A illustrates a cross-sectional profile view 100A of an example cleaning device 101 in a contracted position. FIG. 1B illustrates a cross-sectional profile view 100B of the example cleaning device 101 in an expanded position.

FIG. 1A shows a view 100A of the cleaning device 101 partially inserted into an optical communication device 190. FIG. 1B shows a view 100B of the same cleaning device 101 fully inserted into the optical communication device 190.

In an implementation, the optical communication device 190 is an optical cable coupling structure, such as for example, a ferule. The optical communication device 190 can receive an optical cable within a barrel 150. The barrel 150 is a cylindrical shaped hollow portion that allows insertion of a cylindrical shaped optical fiber cable (not shown). When the optical fiber cable is fully inserted into the barrel, the optical fiber cable makes physical contact with a floor surface 180 of the optical communication device 190.

The cleaning device 101 is proportioned to slide into the barrel 150 of the optical communication device 190 without resistance. The portion of the cleaning device 101 that is inserted into the barrel 150 is slightly narrower than the barrel 150 during insertion. This is because in the contracted position, the rings 145 have a smaller diameter then when they are in the expanded position. In the contracted position, the diameter of the rings and the flexible base in general is not large enough to touch the inner walls 152 of the barrel 150. To operate, a user inserts the cleaning device 101 in a contracted position into the barrel 150 of the optical communication device 190 as shown in FIG. 1A. The user transforms the cleaning device from the contracted position into an expanded position as shown in FIG. 1B. The rings or ring seals 145 are constructed so as to be flexible and expandable between the contracted positions and the expanded position. The particular structure or cross-sectional configuration of each of the rings 145 can vary. They can be ring shaped, triangular-shaped, square-shaped, rectangular shaped, or any other specific configuration in cross-section. Of course the structure of the rings 145 will depend to some degree on a shape of the barrel 150. Generally speaking, the shape of the rings 145 is determined according to a need of engaging in an inner surface of the barrel 150, no matter what the shape or configuration of the barrel 150 is. The rings 145 generally will be complementary to the configuration of the inner surface of the barrel 150 so as to achieve the result of, in the expanded position, capturing dust or any other particulates within the barrel 150 in order to improve communications of the optical mitigation device 190.

The cleaning device 101 includes a hollow outer stem 130 and an inner stem core 120 that runs along a length of the cleaning device 101. The hollow outer stem 130 is cylindrical shaped exterior and has a cylindrical cavity along a length of the hollow outer stem 130. The hollow outer stem 130 could also have other shapes such as a square or rectangular cross-section rather than being cylindrical. The particular shape of the outer stem 130 is not critical to achieving the goal of the concepts disclosed herein. The inner stem core 120 is cylindrical shaped (or other shapes as well, generally matching the shape of the inner cavity of the hollow outer stem 130) and fits within the cavity within the hollow outer stem 130. The inner stem core 120 is slidable within the hollow outer stem 130 along the length of the hollow outer stem 130. The hollow outer stem 130 and the inner stem core 120 can include any rigid construction material including, but not limited to plastics, metal, polymers, glass, etc.

A locking handle 110 is coupled to a top end of the inner stem core 120. A flexible base 160 is coupled to a bottom end of the hollow outer stem 130, opposite to the locking handle 110. A user of the cleaning device 101 can hold the cleaning device 101 by the locking handle 110 to insert the flexible base 160 into the barrel 150 of the optical communication device 190.

The locking handle 110 is shown generally in FIG. 1A and FIG. 1B. The reason for this is that there can be a number of different mechanisms to control the device to convert from the contracted position shown in FIG. 1A to the expanded position shown in FIG. 1B. In some implementations, the locking handle 110 includes a screw mechanism that moves (up or down) the locking handle between the released position and the locked position by rotating the locking handle 110 relative to the hollow outer stem 130. For example, the locking handle 110 can include an internal thread and the hollow outer stem 130 can include an external thread to mate with the internal thread of the locking handle 110.

In some other implementations, the locking handle 110 includes a notching mechanism that moves (up or down) the locking handle from the released position towards the locked position by sliding the locking handle over the hollow outer stem towards the flexible base.

The flexible base 160 can comprise any semi-rigid material, such as plastics, metal, polymers, etc., that allows the flexible base to bend or flex in shape. In some implementations, the flexible base 160 includes a cylindrical upper portion and a cone lower portion, the cylindrical upper portion surrounding a portion of the hollow outer stem, the cone lower portion extending past the hollow outer stem.

At least one ring seal 145 is connected to the outer stem 130 through a flexible base 160. The ring seals are made of a material that is also flexible such that they can expand and contract as controlled by the flexible base. Note the angles of the structure 162 of FIG. 1A and 164 of FIG. 1B of the flexible base 160 relative to the outer stem. Note the head 166 of the flexible base 160 can be configured like at least part of an upside down cone in a contracted position such that an end or a widest portion of the cone does not have a diameter large enough to contact the inner surface 152 of the barrel 150.

The at least one ring seal 145 is coupled to the flexible base 160. Each ring seal 145 can have a disk shaped cross-section (as viewed from top to down in FIGS. 2A and 2B) and encircles a portion of the hollow outer stem 130. Each ring seal 145 can extend out from the hollow outer stem 130 in an upward angle towards the locking handle 110. Three ring seals 145 are shown in the example cleaning device 101 in FIGS. 2A and 2B. Above each ring seal 145 is a contaminant collection space 155.

In general, the flexible base 160 provides a mechanism in which the rings 145 can be configured with a smaller diameter and closer to the hollow outer stem 130 in the compacted position. In the expanded position, a structure adjusts to provide outward pressure and movement radially away from the hollow outer stem 130 and onto the rings 145. As shown in the differences between FIG. 1A and FIG. 1B, the structure that adjusts will expand the flexible rings 145 such that they will touch the inner surface of the barrel 150. This enables the particulates to be retrieved from the barrel and potentially also captured in the cavities 155 between respective rings 145. In order to achieve this functionality, the rings 145 must be flexible in nature and are made from a rubber, foam, or any other flexible material that can both achieve the ability of expanding from a contracted position to an expanded position as well as having a nature or characteristic that collects or attracts contaminant particles.

The cleaning device 101 can deploy one ring seal 145, or two or more ring seals 145, for the purposes of capturing contaminants in the optical communication device 190. For example, the one or more ring seals 145 can be cylindrical, square, rectangular, ring shaped, irregularly shaped, and so forth. The particular shapes illustrated in the figures are by way of example only. It is also noted that as is shown in FIG. 1A and FIG. 1B, the ring seals 145 are angled upward. This is also by way of example as it provides better cavities 155 in which to capture contaminants. However, the shapes may also be circular, semicircular, triangular, horizontally configured, and so forth. The particular shape of each ring seal is not critical to the concepts disclosed herein. Indeed, one ring seal may be of a first shape, with a second ring seal being a second shape. A third ring seal could be the first shape, the second shape, or third different shape. Additionally, while not shown, each ring seal, or one of the ring seals, can include notches, rougher surfaces, or any other variation of structure or shape which can help to gather contaminants out of the barrel 150.

The user can transform the cleaning device 101 between the contracted position show in FIG. 1A and the expanded position shown in FIG. 1B using the locking handle 110. The locking handle 110 is movable between the released position and the locked position, which correspondingly transforms the cleaning device 101 between the contracted position and the expanded position. When the locking handle 110 moves from the released position towards the locked position, the inner stem core 120 slides down relative to the hollow outer stem 130 as well as relative to the flexible base 160 coupled to the hollow outer stem 130.

The flexible base 160 transforms from the contracted position to the expanded position as the locking handle 110 moves from the released position towards the locked position. A diameter of the flexible base (view from top to bottom) in the contracted position is smaller than a diameter of the flexible base in the expanded position. In some implementations, the flexible base 160 is made of a hollow outer shell. In some other implementations, the flexible base 160 is filled with a filler that allows the flexible base 160 to bend or flex. In the expanded position, the flexible base 160 expands outward from the hollow outer stem 130, towards the barrel 150 of the optical communication device 190. The ring seals 145 are each expanded to contact the inner surface of the barrel 150, when the flexible base 160 expands into the expanded position.

A flexible cover 158 wraps around flexible base 160 and can also wrap around one or more of the ring seals 145. In some implementations the flexible cover 158 adheres closely to a surface of the flexible base and the ring seals 145 to form a skin. The flexible cover 158 can include any elastic material such as cloth, rubber, natural or synthetic textiles, etc., that can expand or contract with the transformation of the flexible base between the contracted position and expanded position. The flexible cover 158 attracts contaminants residing in barrel 150 of the optical communication device 190 that the flexible cover 158 touches.

When the flexible base 160 transforms from the contracted position to the expanded position, the flexible base 160 expands to place the flexible cover 158 to contact the barrel 150 and floor surface 180 of the optical communication surface 190. In some implementations, the flexible cover 158 contacts with substantially the entire floor surface 180 when the cleaning device 101 is in the expanded position. In other cases, the flexible cover 158 can be positioned to extend over each of the ring seals 145 such that more portions of the flexible cover 158 contacts the inner surface 152 of the barrel 150 when the cleaning device 101 is in the expanded position.

In the process of expanding, note that structure 162 shown in FIG. 1A changes from an oblique angle to a horizontal position 164 shown in FIG. 1B. This change in structure 162 causes the at least one ring 145, and the flexible base 160 to increase in their diameter and thus expand outward to diameter great enough to touch the inner surface 132 of the barrel 150. In the expanded position, one or more ring seals 145 expands to contact the inside surface 152 of the barrel 150.

The user can rotate the cleaning device within the barrel 150 to collect contaminants from the optical communication device 190 to one or more contaminant collection spaces 155. In one aspect, some of the contaminants can be captured by the at least one ring 145 or the flexible cover 158. The user lastly removes the cleaning device 101, still in the expanded position, from the barrel 150, along with the contaminants collected in the contaminant collection spaces 155 and/or contained on one of the other surfaces of the seal rings 145 or flexible cover 158.

In some implementations, the cleaning device 101 includes an optional stem head 170 coupled to the inner stem core 120 within the flexible base 160. Note that the stem head 170 is not used for the optical communication device shown in FIGS. 1A and 1B, and is an optional component in the cleaning device 101.

As noted above, the shapes of the various elements do not have to be cylindrical but can be any cross-sectional shape such as rectangular, square, and so forth.

Figure 2A:
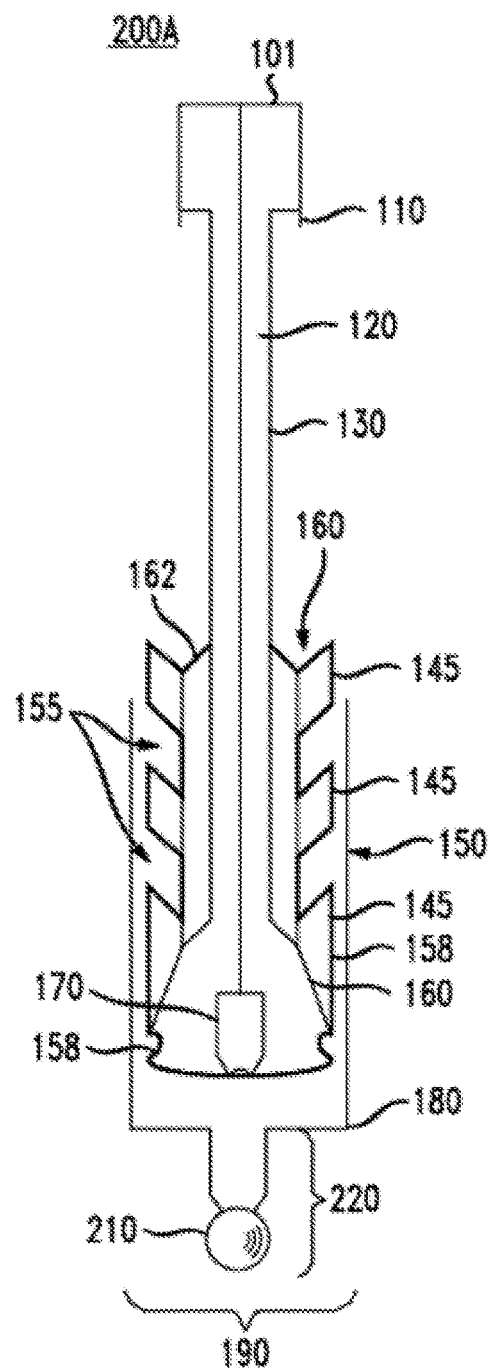
FIG. 2A illustrates another cross-sectional profile view of the example cleaning device of FIG. 1A in the contracted position.
Figure 2B:
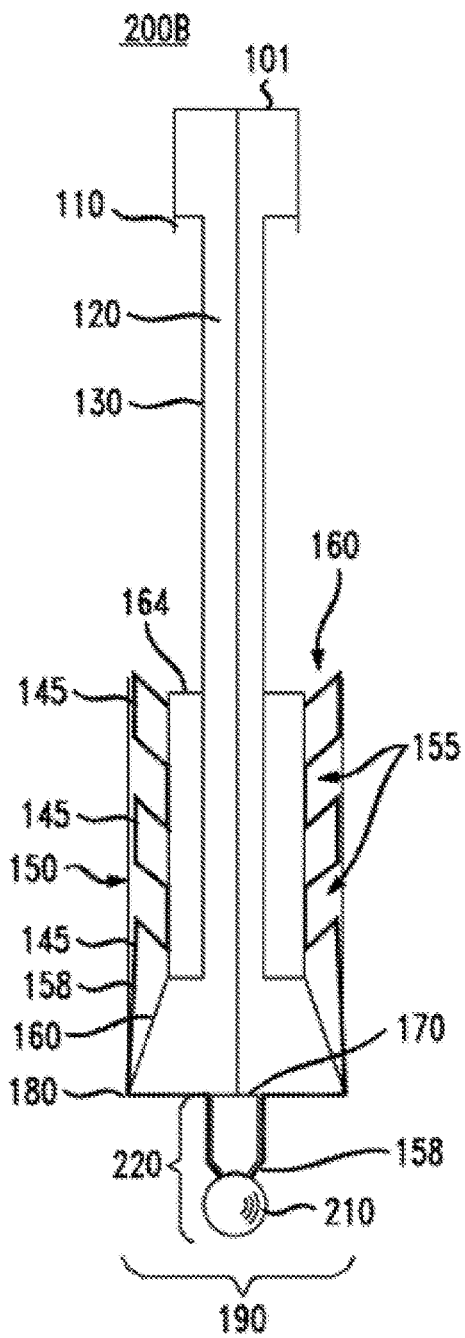
FIG. 2B illustrates another cross-sectional profile view of the example cleaning device of FIG. 1A in a second expanded position.

FIG. 2A illustrates another cross-sectional profile view 200A of the example cleaning device 101 in the contracted position. FIG. 2B illustrates another cross-sectional profile 200B view of the example cleaning device in a second expanded position.

FIG. 2A shows a view 200A of the cleaning device 101 partially inserted into an optical communication device 190. FIG. 2B shows a view 200B of the same cleaning device 101 fully inserted into the optical communication device 190.

In an implementation, the optical communication device 190 is an optical cable coupling structure, such as for example, a ferule. The optical communication device 190 can receive an optical cable within a barrel 150. The barrel 150 is a cylindrical shaped hollow portion that allows insertion of a cylindrical shaped optical fiber cable (not shown). When the optical fiber cable is fully inserted into the barrel, the optical fiber cable makes physical contact with a ball lens 210 of the optical communication device 190.

The optical communication device 190 differs from the optical communication device 190 of FIGS. 1A and 1B in that the optical communication device 190 includes an additional passage 220 leading to the balls lens 210, which is not present in the optical communication device 190.

The cleaning device 101 is proportioned to slide into the barrel 150 of the optical communication device 190 without resistance. The portion of the cleaning device 101 that is inserted into the barrel 150 is slightly narrower than the barrel 150 during insertion because the device 101 is in the contracted position. To operate, a user inserts the cleaning device 101 in a contracted position shown in FIG. 2A into the barrel 150 of the optical communication device 190. The user transforms the cleaning device 101 into a second expanded position shown in FIG. 2B. The user may rotate the cleaning device 101 within the barrel 150 to collect contaminants in the optical communication device 190. The functionality is similar to what is described above in FIG. 1A and FIG. 1B. The user lastly removes the cleaning device 101, still in the expanded position, from the barrel 150, along with the contaminants collected.

The cleaning device 101 includes a hollow outer stem 130 and an inner stem core 120 that runs along a length of the cleaning device 101. The hollow outer stem 130 is cylindrical shaped exterior (or could be other shapes) and has a cylindrical cavity or other shapes) within along a length of the hollow outer stem 130. The inner stem core 120 is cylindrical shaped and fits within the cylindrical cavity within the hollow outer stem 130. The inner stem core 120 is slidable within the hollow outer stem 130 along the length of the hollow outer stem 130. The hollow outer stem 130 and the inner stem core 120 can include any rigid construction material including, but not limited to plastics, metal, polymers, glass, etc. again, where a particular type of shape such as a cylindrical shape is reference, it should be read to include or encompass any other potential shape as these particular shapes are not critical to the concepts disclosed herein.

A locking handle 110 is coupled to a top end of the inner stem core 120. A flexible base 160 is coupled to a bottom end of the hollow outer stem 130, opposite to the locking handle 110. A user of the cleaning device 101 can hold the cleaning device 101 by the locking handle 110 to insert the flexible base 160 into the barrel 150 of the optical communication device 190.

The locking handle 110 is shown generally in FIG. 2A and FIG. 2B. The reason for this is that there can be a number of different mechanisms to control the device to convert from the contracted position shown in FIG. 2A to the expanded position shown in FIG. 2B. In some implementations, the locking handle 110 includes a screw mechanism that moves (up or down) the locking handle 110 between the released position and the locked position by rotating the locking handle 110 relative to the hollow outer stem 130. For example, the locking handle 110 can include an internal thread and the hollow outer stem 130 can include an external thread to mate with the internal thread of the locking handle 110.

In some other implementations, the locking handle 110 includes a notching mechanism that moves (up or down) the locking handle from the released position towards the locked position by sliding the locking handle 110 over the hollow outer stem 130 towards the flexible base 160.

The flexible base 160 can include any semi-rigid material, such as to plastics, metal, polymers, etc., that allows the flexible base to bend or flex in shape. In some implementations, the flexible base 160 includes a cylindrical upper portion and a cone lower portion, the cylindrical upper portion surrounding a portion of the hollow outer stem, the cone lower portion extending past the hollow outer stem.

At least one ring seal 145 is coupled to the flexible base 160. Each ring seal 145 has a disk shaped cross-section (as viewed from top to down in FIGS. 2A and 2B) and encircles a portion of the hollow outer stem 130. Each ring seal 145 can extend out from the hollow outer stem 130 in an upward angle towards the locking handle 110. Three ring seals 145 are shown in the example cleaning device 101 in FIGS. 2A and 2B. Above each ring seal 145 is a contaminant collection space 155. The cleaning device 101 can deploy one ring seal 145, or two or more ring seals 145, for the purposes of capturing contaminants in the optical communication device 190. For example, the one or more ring seals 145 can be cylindrical, square, rectangular, ring shaped, irregularly shaped, and so forth. The particular shapes illustrated in the figures are by way of example only. It is also noted that as is shown in FIG. 1A and FIG. 1B, the ring seals 145 are angled upward. This is also by way of example as it provides better cavities 155 in which to capture contaminants. However, the shapes may also be circular, semicircular, triangular, horizontally configured, and so forth. The particular shape of each ring seal is not critical to the concepts disclosed herein. Indeed, one ring seal may be of a first shape, with a second ring seal being a second shape. A third ring seal could be the first shape, the second shape, or third different shape. Additionally, while not shown, each ring seal, or one of the ring seals, can include notches, rougher surfaces, or any other variation of structure or shape which can help to gather contaminants out of the barrel 150.

The user can transform cleaning device 101 between the contracted position 101 shown in FIG. 2A and the expanded position shown in FIG. 2B using the locking handle 110. The locking handle 110 is movable between a released position and a locked position, which correspondingly transforms the cleaning device 101 between the contracted position and the expanded position. When the locking handle 110 moves from the released position towards the locked position, the inner stem core 120 slides down relative to the hollow outer stem 130 as well as relative to the flexible base 160 coupled to the hollow outer stem 130.

The flexible base 160 transforms from a contracted position to an expanded position as the locking handle 110 moves from the released position towards the locked position. A diameter of the flexible base (view from top to bottom) in the contracted position is smaller than a diameter of the flexible base in the expanded position. In some implementations, the flexible base 160 is included of a hollow outer shell. In some other implementations, the flexible base 160 is filled with a filler that allows the flexible base 160 to bend or flex. In the expanded position, the flexible base 160 expands outward from the hollow outer stem 130, towards the barrel 150 of the optical communication device 190. The ring seals 145 are each expanded to contact the inner surface of the barrel 150, when the flexible base expands into the expanded position.

A flexible cover 158 wraps around flexible base 160 and can also wrap around one or more of the ring seals 145. In some implementations the flexible cover 158 adheres closely to a surface of the flexible base and the ring seals 145 to form a skin. The flexible cover can include any elastic material such as cloth, rubber, natural or synthetic textiles, etc., that can expand or contract with the transformation of the flexible base between the contracted position and expanded position. The flexible cover attracts contaminants residing in barrel 150 of the optical communication device 190 that the flexible cover 158 touches.

When the flexible base 160 transforms from the contracted position to the expanded position, the flexible base 160 expands to place the flexible cover 158 to contact the barrel 150 and floor surface 180 of the optical communication surface 190. In some implementations, the flexible cover 158 contacts with substantially the entire floor surface 180 when the cleaning device 101 is in the expanded position. In some implementations, the flexible cover 158 over each of the ring seals 145 contacts the barrel 150 when the cleaning device 101 is in the expanded position.

In the process of expanding, note that structure 162 shown in FIG. 1A changes from an oblique angle to a horizontal position 164 shown in FIG. 1B. This change in structure 162 causes the at least one ring 145, and the flexible base 160 to increase in their diameter and thus expand outward to diameter great enough to touch the inner surface 132 of the barrel 150. In the expanded position, one or more ring seals 145 expands to contact the inside surface 152 of the barrel 150.

The cleaning device 101 includes a stem head 170 coupled to the inner stem core 120 within the flexible base 160, where the locking handle 110 is further movable to an extended locking position. The stem head 170 is extended beyond the flexible base 160 to the second expanded position when the locking handle 110 is moved from the locked position to the extended locking position. In the second expanded position, the stem head 170 extends into and substantially fills an entirety of the additional passage 220 leading to the balls lens 210. The flexible cover 158 is configured around at least a head 166 of the flexible base 160 and a fiber stem head 170. In the second expanded position, the flexible cover 158 makes contact with a surface of the ball lens 210.

After the cleaning device 101 is in the second expanded position, the user can rotate the cleaning device within the barrel 150 to collect contaminants from the optical communication device 190 to one or more contaminant collection spaces 155. In one aspect, some of the contaminants can be captured by the at least one ring 145 or the flexible cover 158. The user lastly removes the cleaning device 101, still in the second expanded position, from the barrel 150, along with the contaminants collected in the contaminant collection spaces 155 and/or contained on one of the other surfaces of the seal rings 145 or flexible cover 158.

As noted above, the shapes of the various elements do not have to be cylindrical but can be any cross-sectional shape such as rectangular, square, and so forth.

Figure 3:
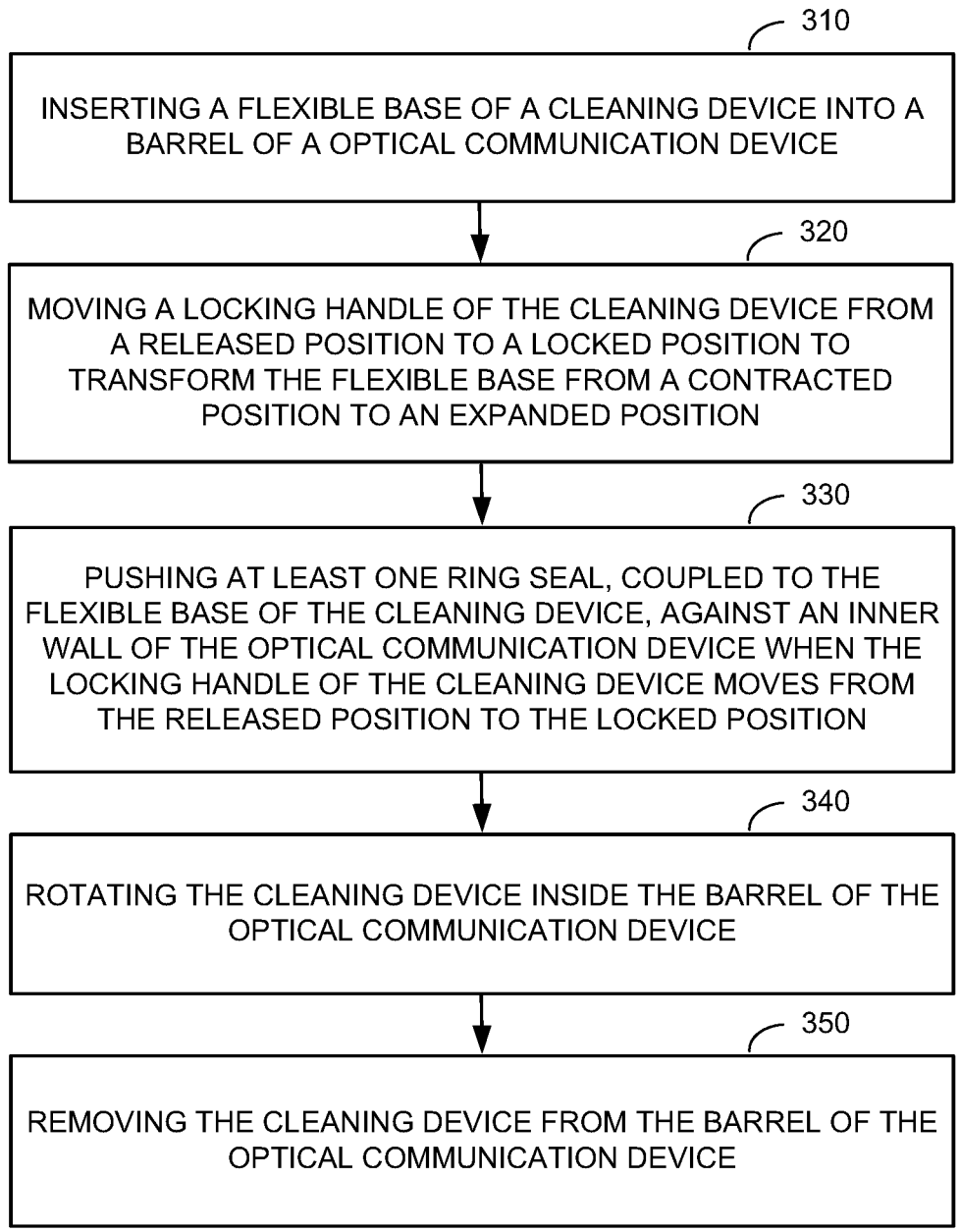
FIG. 3 illustrates an example methodology for cleaning an optical communication device.

FIG. 3 illustrates an example methodology 300 for cleaning an optical communication device, by a cleaning device.

At step 310, the cleaning device inserts a flexible base of the cleaning device into a barrel of the optical communication device.

At step 320, the cleaning device moves a locking handle of the cleaning device from a released position to a locked position to transform the flexible base from a contracted position to an expanded position. In the expanded position, at least one ring seal of the cleaning device are each expanded to contact the inner surface of the optical communication device.

At step 330, the cleaning device pushes the at least one ring seal, coupled to the flexible base of the cleaning device, against an inner wall of the optical communication device when the locking handle of the cleaning device moves from the released position to the locked position. In some implementations, above each ring seal is a contaminant collection space.

At step 340, the cleaning device rotates the cleaning device inside the barrel of the optical communication device.

At step 350, the cleaning device removing the cleaning device from the barrel of the optical communication device.

In some implementations, the cleaning device further collects contaminants from the optical communication device around the at least one ring seal, wherein removing the cleaning device removes the contaminants from the optical communication device.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A device for cleaning an optical communication device, comprising:
    a hollow outer stem;
    an inner stem core, fitting within a length of the hollow outer stem and slidable along the length of the hollow outer stem;
    a locking handle coupled to a top end of the inner stem core, movable between a released position and a locked position, wherein moving the locking handle to the locked position from the released position slides the inner stem core within the hollow outer stem;
    a flexible base coupled to a bottom end of the hollow outer stem, transformable between a contracted position when the locking handle is in the released position and an expanded position when the locking handle is in the locked position, wherein a radius of the flexible base in the expanded position is larger than in the contracted position;
    at least one ring seal coupled to the flexible base; and
    a flexible cover wrapped around the flexible base and the at least one ring seal.

2. The device of claim 1, wherein the at least one ring seal pushes against an inner wall of the optical communication device when the flexible base is in the expanded position.

3. The device of claim 1, wherein the flexible base comprises a cylindrical upper portion and a cone lower portion, the cylindrical upper portion fully encircling a portion of the hollow outer stem, the cone lower portion extending past the hollow outer stem.

4. The device of claim 1, wherein each of the at least one ring seal is angled in a direction towards the locking handle.

5. The device of claim 1, wherein each of the at least one ring seal is separated by a contaminant collection space.

6. The device of claim 1, wherein the flexible cover is comprised of an elastic material.

7. The device of claim 1, wherein the locking handle comprises a screw mechanism that moves the locking handle between the released position and the locked position by rotating the locking handle relative to the hollow outer stem.

8. The device of claim 7, wherein the locking handle comprises an internal thread and the hollow outer stem comprises an external thread to mate with the internal thread of the locking handle.

9. The device of claim 1, wherein the locking handle comprises a notching mechanism that moves the locking handle from the released position towards the locked position by sliding the locking handle over the hollow outer stem towards the flexible base.

10. The device of claim 1, further comprising a stem head coupled to the inner stem core within the flexible base, wherein the locking handle is further movable to an extended locking position, the stem head is extended beyond the flexible base to a second expanded position when the locking handle is moved from the locked position to the extended locking position, and the flexible cover is additionally wrapped around the stem head when the stem head is extended.

11. The device of claim 10, wherein the stem head has a shape of a cavity of the optical communication device that leads to a ball lens.

12. The device of claim 1, wherein the at least one ring seal is transformable between a contracted shape when the locking handle is in the released position and an expanded shape when the locking handle is in the locked position, the expanded shape of the at least one ring seal having a larger radius than the contracted shape of the at least one ring seal.

13. The device of claim 12, wherein when the device is inserted into a barrel of optical communication device:
   the radius of at least one seal ring in the contracted shape is smaller than a radius of the barrel, and
   the radius of the at least one seal ring in the expanded shape matches the radius of the barrel such that during movement of the device relative to the barrel the at least one seal ring cleans an interior shaft of the barrel.

* * * * *